United States Patent [19]

Akiyama et al.

[11] Patent Number: 4,484,815
[45] Date of Patent: Nov. 27, 1984

[54] SPECTROPHOTOMETER

[75] Inventors: Osamu Akiyama, Kyoto; Tetsuo Ichikawa, Shiga, both of Japan; Yoshio Tsunazawa, Meerbusch, Fed. Rep. of Germany

[73] Assignee: Shimadzu Corporation, Kyoto, Japan

[21] Appl. No.: 361,145

[22] Filed: Mar. 24, 1982

[30] Foreign Application Priority Data

Apr. 30, 1981 [JP] Japan .................................. 56-66357

[51] Int. Cl.$^3$ .............................................. G01J 3/42
[52] U.S. Cl. .................................................. 356/325
[58] Field of Search ................ 356/319, 320, 323–325, 356/408, 434, 448; 250/207

[56] References Cited

U.S. PATENT DOCUMENTS

| | | | |
|---|---|---|---|
| 2,494,440 | 1/1950 | Haynes | 356/325 |
| 3,516,746 | 6/1970 | Shibata et al. | 356/319 |
| 4,283,142 | 8/1981 | De Steur et al. | 356/319 |

Primary Examiner—F. L. Evans
Attorney, Agent, or Firm—Fidelman, Wolffe and Waldron

[57] ABSTRACT

A double-beam spectrophotometer comprising a light source, a monochromator, optical means for causing the monochromatic light beam from the monochromator to alternately advance along a pair of optical paths, the axes of which intersect generally perpendicularly to each other, a pair of cells each disposed in one of the two optical paths, and a photoelectric detector disposed at or adjacent the point of intersection of the pair of optical paths.

8 Claims, 6 Drawing Figures

PRIOR ART

SPECTROPHOTOMETER

BACKGROUND OF THE INVENTION

This invention relates to a double-beam spectrophotometer.

In a typical double-beam spectrophotometer with a single detector, the monochromatic light emerging from a monochromator is caused by a rotating sector mirror to alternately advance along two separate optical paths, the beams on which are referred to as the sample and reference beams, in which a sample and a sample cell are disposed respectively. The two optical paths are again combined into a single path, along which the sample and reference beams are caused by a beam combiner to alternately advance to a single detector such as a photomultiplier tube.

The above arrangement is suitable for measurement of those liquid samples which do not scatter light. However, it is not suitable for measurement of a sample having light scattering property or a sample such as an optical instrument itself just assembled or a sample which must be kept at a particular temperature different from room temperature.

In particular, if a light scattering sample is to be measured, it must be disposed as close to the detector as possible. Between the sample and the detector, however, there must be a considerable optical distance or a structural space enough to accommodate several optical elements such as a sector mirror or other mirrors, so that most of the light scattered by the sample is lost before it reaches the detector.

Given samples vary in size and shape, and for measurement of large-sized samples the instrument must have as large a space as possible to accommodate a large-sized sample. The optical system of a typical double-beam spectrophotometer, however, provides only a limited space between two sector mirrors for a sample to be put in, so that there is a limitation to the size and shape of the sample that can be set in the instrument for measurement.

The same difficulty is encountered when a sample cell is provided with an attachment such as a constant temperature bath or a cell positioner.

SUMMARY OF THE INVENTION

Accordingly, the primary object of the invention is to provide a double-beam spectrophotometer which is provided with a space or room large enough to accommodate a large-sized sample.

Another object of the invention is to provide such a double-beam spectrophotometer as aforesaid in which a sample having light scattering property can be positioned as close to the detector as possible.

Briefly stated, in accordance with the invention the optical axes of the reference and sample beams intersect or meet at approximately 90° at a point where a detector is placed to receive the two beams alternately.

Preferably a beam mixer is provided in the sample and reference beams immediately in front of the detector so that the two beams are received by the detector evenly and uniformly distributed all over the photosensitive surface thereof.

The arrangement of the invention enables information from the optical system of the elements required in the conventional arrangement to combine the two paths of the sample and reference beams into a common path before the detector, so that a larger space or room for a sample to be placed in can be provided and the distance between the sample and the detector can be made very short, with only the beam mixer being interposed therebetween.

The invention will be described in detail with reference to the accompanying drawings.

DETAILED DESCRIPTION OF THE ILLUSTRATED EMBODIMENTS

Figure 1:
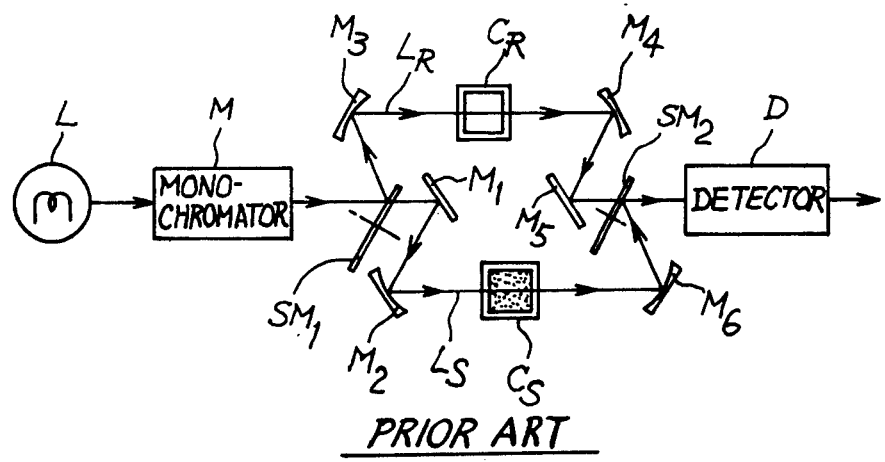
FIG. 1 shows a schematic layout of a typical double-beam spectrophotometer.

FIG. 1 schematically shows a typical double-beam spectrophotometer with a single detector, wherein a monochromator M disperses the light from a lamp L into different wavelengths, among which a selected one is caused by a first rotating sector mirror $SM_1$ to alternately advance along two optical paths $L_S$ and $L_R$. In the following description, the two paths will be referred to as the sample and reference paths, respectively, and the light beams thereon will be referred to as the sample and reference beams and designated by the same symbols $L_S$ and $L_R$ as the corresponding paths, respectively.

The sample beam $L_S$ is directed by mirrors $M_1$ and $M_2$ to pass through a sample cell $C_S$, while the reference beam $L_R$ is directed by a mirror $M_3$ to pass through a reference cell $C_R$. The reference beam $L_R$ from the reference cell $C_R$ is reflected by mirrors $M_4$ and $M_5$ and passes through a second rotating sector mirror $SM_2$ so as to be projected onto a detector D, while the sample beam $L_S$ from the sample cell $C_S$ is reflected by a mirror $M_6$ and caused by the second rotating sector mirror $SM_2$ to advance along the same path as the reference beam $L_R$ alternately therewith onto the detector D. As previously mentioned, the prior art arrangement provides no space or room for the two cells to be placed in immediately before the detector D.

Figure 2:
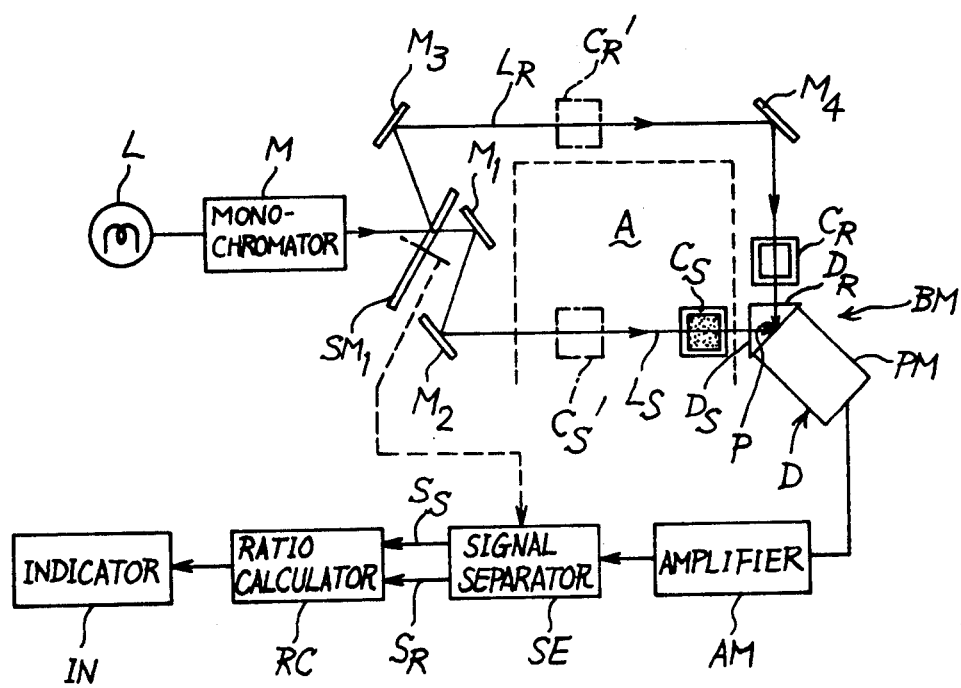
FIG. 2 shows a schematic layout of one embodiment of the invention.

FIG. 2 shows one embodiment of the invention. In FIG. 2, the same reference symbols and numerals as in FIG. 1 designate corresponding elements so that explanation about these elements will not be given.

Characteristic of the invention is that the optical axes of the reference and sample beams $L_R$ and $L_S$ intersect or meet at 90° or an angle close thereto and that at the point where the two optical axes intersect or meet the photosensitive surface of a detector D is positioned, with a beam mixer BM being provided in the optical paths of the two beams $L_R$ and $L_S$ immediately before the photosensitive surface of the detector.

In the arrangement of FIG. 2, the mirrors $M_2$ and $M_4$ are so arranged as to cause the sample and reference beams $L_S$ and $L_R$ to advance toward the detector D and meet perpendicularly to each other at a point P on the photosensitive surface thereof, and the beam mixer BM comprises a pair of light diffusing plates $D_R$ and $D_S$ so arranged as to meet along their corresponding sides or edges substantially perpendicularly to each other thereby to form a roof-shaped configuration. The detector D can be an end-on type of photomultiplier tube PM, and the roof-shaped diffusers are positioned immediately in front of the photosensitive surface of the tube PM, so that the reference and sample beams may not impinge directly on the photosensitive surface of the tube PM but fall on the light diffusers $D_S$ and $D_R$, respectively, perpendicularly thereto so as to be diffused thereby and evenly distributed all over the photosensitive surface of the tube PM. The photomultiplier tube PM is so arranged that the photosensitive surface thereof makes an angle of 45° with each of the reference and sample beams $L_R$ and $L_S$.

The provision of the light diffusers is particularly useful for fine and accurate measurement of a transparent sample for the following reasons. As is well known, the sensitivity of a photomultiplier tube varies locally on the photosensitive surface thereof. In the arrangement of FIG. 2 ideally the two optical paths are so arranged as to meet at the same point on the photosensitive surface of the photomultiplier tube PM. Practically, however, the incident points of the two beams on the photosensitive surface are more or less displaced from each other. Moreover, the energy distribution in the transverse section of one of the two beams is different from that of the other beam. Therefore, without the light diffusers an error would be caused by the two beams directly incident on the photosensitive surface of the photomultiplier tube due to the above-mentioned local difference in sensitivity.

The provision of the beam mixer in accordance with the invention, however, effects even and uniform distribution of optical energy in the transverse section of each of the two beams and eliminates adverse influences by noncoincidence of the incident points of the two beams on the photosensitive surface of the photomultiplier tube thereby to attain a high degree of equivalence of the two light beams.

In FIG. 2 when a suspension sample is to be measured, a sample cell $C_S$ containing the suspension and a reference cell $C_R$ containing a solvent are placed in the sample and reference beams and in contact with or close to the light diffusers $D_S$ and $D_R$ respectively. The scattered light from the sample cell $C_S$ immediately reaches the diffuser $D_S$ to be diffused thereby so that almost all of the light from the sample cell can be received by the photosensitive surface of the photomultiplier tube PM.

When a transparent liquid sample is to be measured, the sample and reference cells may be set either in contact with the light diffusers as in the case of a suspension sample or midway in the optical paths $L_S$ and $L_R$ as at $C_S'$ and $C_R'$ respectively. Generally, the arrangement of FIG. 2 provides quite a large area or space A to accommodate a sample to be measured.

The outputs from the detector D caused by the sample and reference beams respectively are amplified by an amplifier AM and separated by a signal separator SE operating in synchronism with the rotating sector mirror $SM_1$ into a sample and a reference signal $S_S$ and $S_R$. A ratio calculator RC calculates the ratio of the two signals and produces an output corresponding to the concentration of the sample, which is applied to an indicator or recorder IN.

Figure 3:
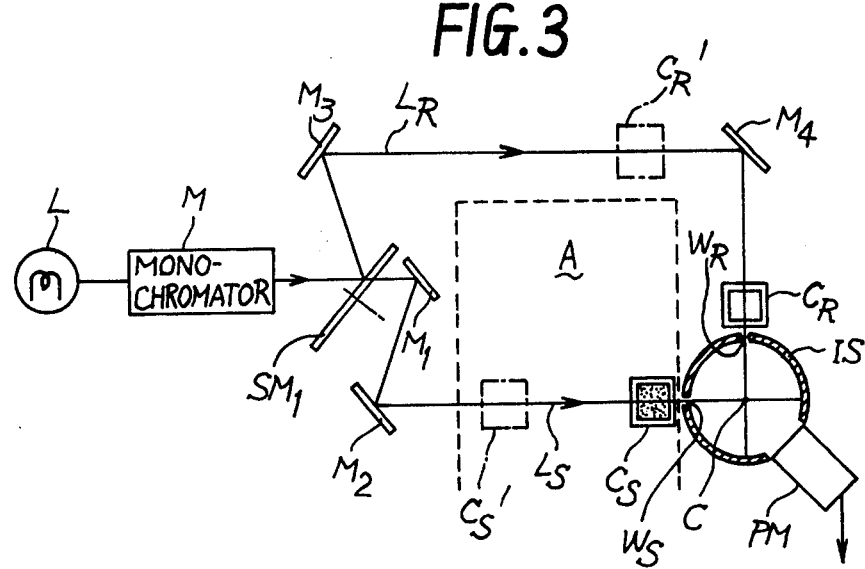
FIG. 3 is a view similar to FIG. 2 but showing another embodiment of the invention.

The roof-shaped beam mixer BM in the arrangement of FIG. 2 may be replaced by an integrating sphere IS as shown in FIG. 3, wherein the optical system is the same as in FIG. 2. The integrating sphere IS is formed with a pair of windows $W_S$ and $W_R$ spaced 90° apart from each other, through which the sample and reference beams $L_S$ and $L_R$ are introduced into the sphere so as to intersect each other at the center C of the sphere. An end-on type of photomultiplier tube PM is attached to the sphere IS in such a manner that the photosensitive surface of the photomultiplier tube PM is positioned beyond the point C of intersection of the two beams and faces inwardly of the sphere, making an angle of 45° with each of the optical axes of the two beams.

Figure 4:
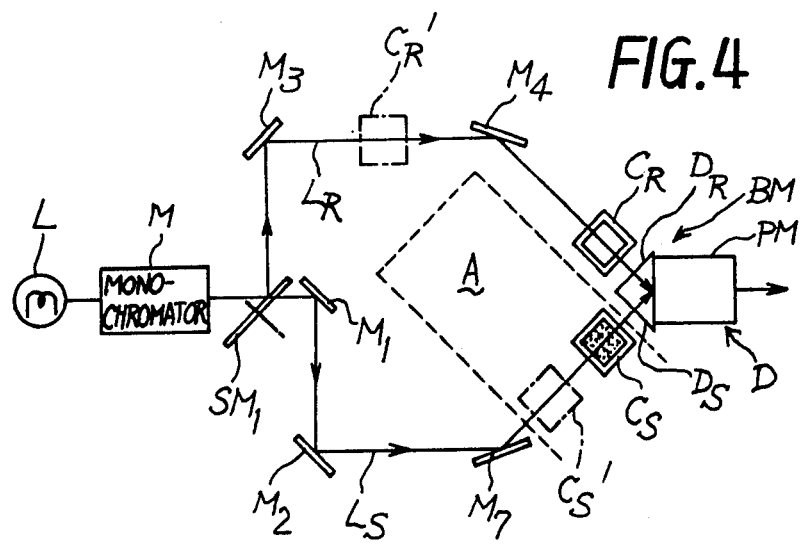
FIG. 4 is a view similar to FIG. 2 but showing a third embodiment of the invention.

FIG. 4 schematically shows another embodiment of the invention, wherein a high degree of optical equivalence between the sample and reference beams can be attained by making the lengths of the optical paths of the two beams substantially equal and causing the two beams to be reflected the same number of times by the same number of mirrors.

In FIG. 4 the same reference symbols and numerals as in FIG. 2 designate corresponding elements. A mirror $M_7$ is added to the optical system on the side of the sample beam $L_S$ in a symmetrical position with the mirror $M_4$ on the side of the reference beam $L_R$.

As can be easily seen, the reference beam $L_R$ is reflected three times by the sector mirror $SM_1$, the mirrors $M_3$ and $M_4$ and impinges on the diffusing plate $D_R$, while the sample beam $L_S$ is also reflected three times by the mirrors $M_1$, $M_2$ and $M_7$ and then impinges on the diffusing plate $D_S$. The optical paths of the two beams are of substantially the same length.

Figure 5:
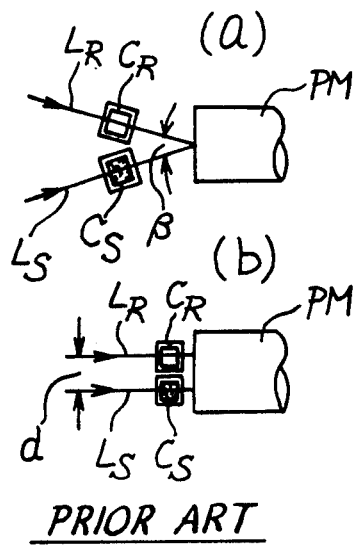
FIGS. 5(a) and 5(b) schematically show different conventional arrangements of two cells in front of a photoelectric element.

For measurement of a suspension sample by a double-beam spectrophotometer it has been proposed to arrange both the reference and sample cells $C_R$ and $C_S$ side by side adjacent the photosensitive surface of an end-on type of photomultiplier tube as shown in FIGS. 5(a) and 5(b). The arrangement ensures efficient projection of the scattered light from the sample onto the photosensitive surface of the photomultiplier tube. However, since the optical axes of the reference and sample beams $L_R$ and $L_S$ run parallel with a short distance d therebetween as in FIG. 5(b) or intersect at a small angle $\beta$ as in FIG. 5(a), there can be provided on the side of the sample beam $L_S$ only a small limited space or room for a sample in order to avoid mutual interference between the two beams.

In accordance with the invention, however, since the optical paths of the sample and reference beams intersect at 90° or an angle close thereto, the space or room for a sample to be placed in is expanded or enlarged laterally toward the optical path of the reference beam without receiving any interference from the reference beam. With the enlarged room for a sample to be placed in the spectrophotometer of the invention can measure various kinds of samples, such as transparent liquid samples, suspension samples, samples of various shapes and sizes and samples with an attachment. The spectrophotometer of the invention is simple in structure.

What we claim is:

1. A double-beam spectrophotometer comprising: means for producing a monochromatic light beam; optical means for causing said beam to alternately advance along a first and a second optical path, the axes of which intersect at approximately 90°; a first cell disposed in said first optical path; a second cell disposed in said second optical path; photoelectric means disposed adjacent the point of intersection of said first and second optical paths; and means disposed in front of said photoelectric means for diffusing said monochromatic light beam of said first and second paths, said light diffusing means comprising a pair of light diffusing plates so arranged as to meet along corresponding sides thereof at approximately 90° thereby to form a roof-shaped configuration, said plates being positioned in front of the photosensitive surface of said photoelectric means so that said beams on said first and second optical paths are incident on said light diffusing plates perpendicularly thereto.

2. The double-beam spectrophotometer of claim 1, wherein said photoelectric means comprises an end-on type of photomultiplier tube having a photosensitive surface disposed at said point of intersection of said first and second optical paths.

3. The double-beam spectrophotometer of claim 1, wherein said first and second optical paths are optically substantially equivalent.

4. The double-beam spectrophotometer of claim 1, wherein one of said first and second optical paths has a first portion running parallel with and spaced a predetermined distance from a corresponding portion of the other of said optical paths and a second portion extending from said first portion substantially perpendicularly thereto so as to intersect said corresponding portion of said other optical path substantially perpendicularly thereto, with said photoelectric means being disposed adjacent said point of intersection of said first and second optical paths.

5. The double-beam spectrophotometer of claim 1, wherein said first and second optical paths have corresponding first portions running parallel with and spaced a predetermined distance from each other and corresponding second portions extending from said first portions at substantially 45° thereto so as to intersect substantially perpendicularly to each other at a point, adjacent to which said photoelectric means is disposed.

6. The double-beam spectrophotometer of claim 1, wherein said first and second cells are disposed close to said light diffusing means.

7. The double-beam spectrophotometer of claim 4, said first and second cells being disposed in said parallel portions of said first and second optical paths, respectively.

8. The double-beam spectrophotometer of claim 5, wherein said first cell is disposed in said first portion of one of said first and second optical paths and said second cell is disposed in said second portion of the other of said first and second optical paths.

* * * * *